May 10, 1938.  A. KÉGRESSE  2,116,835
FLEXIBLE JOINT FOR MACHINE PARTS
Filed April 9, 1936  2 Sheets-Sheet 1
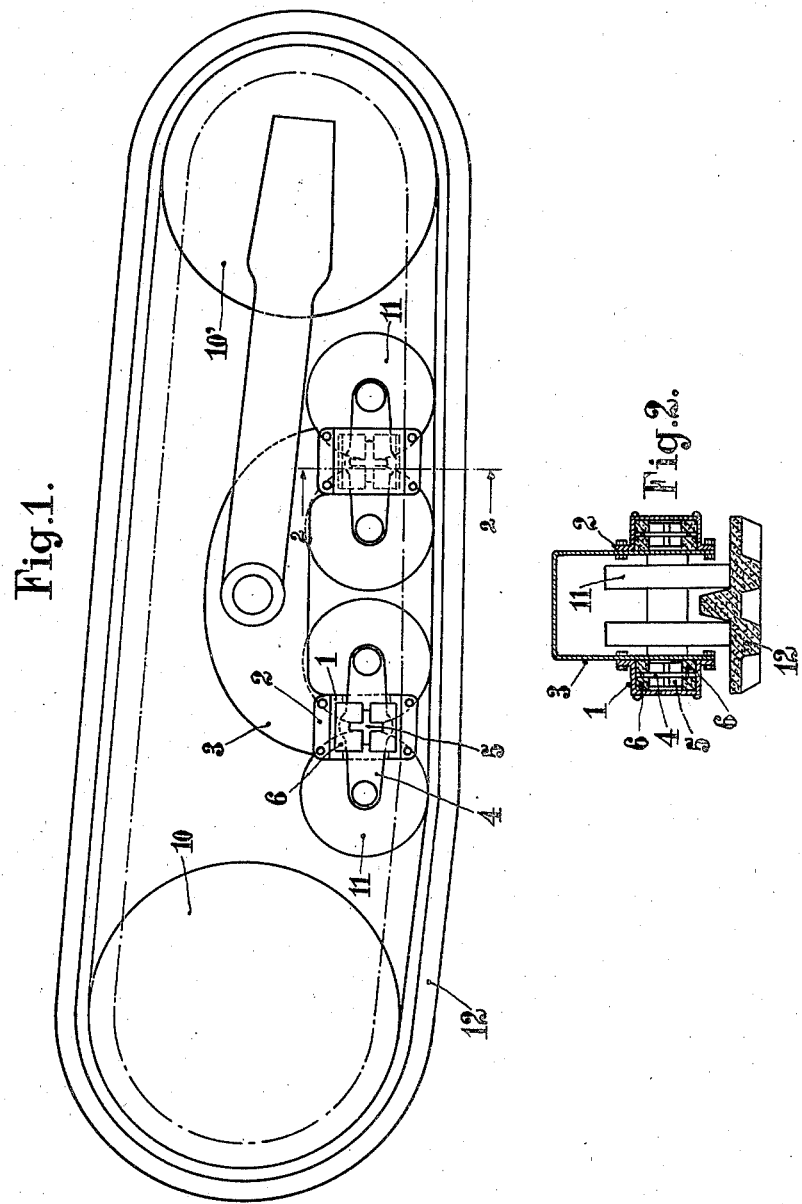
INVENTOR
ADOLPHE KEGRESSE
BY
Emil Bönnelycke
ATTORNEY May 10, 1938.    A. KÉGRESSE    2,116,835
FLEXIBLE JOINT FOR MACHINE PARTS
Filed April 9, 1936    2 Sheets-Sheet 2
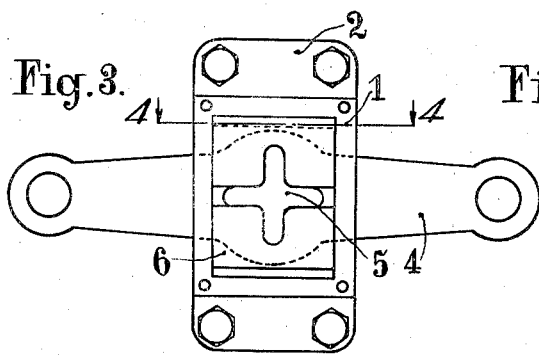
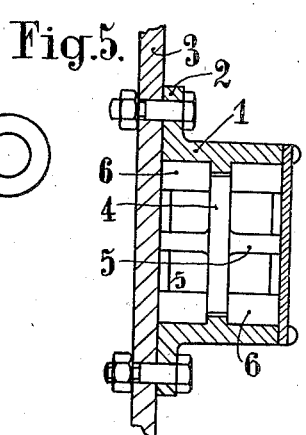
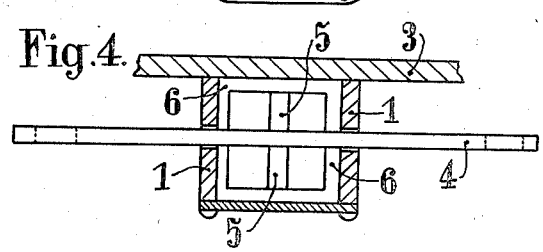
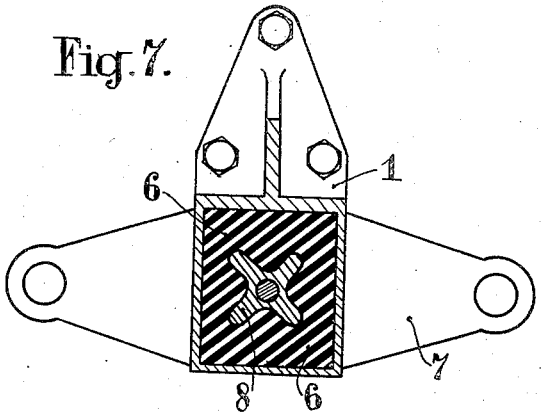
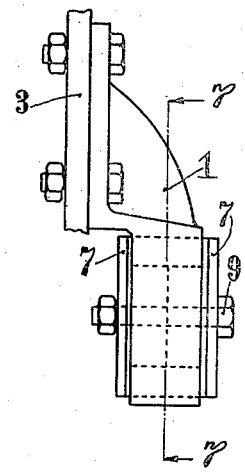
INVENTOR
ADOLPHE KÉGRESSE
BY
Emil Bönnelycke
ATTORNEY Patented May 10, 1938

2,116,835

UNITED STATES PATENT OFFICE 2,116,835

FLEXIBLE JOINT FOR MACHINE PARTS

Adolphe Kégresse, Paris, France

Application April 9, 1936, Serial No. 73,545
In France July 13, 1932

2 Claims. (Cl. 305—9)

This application is a continuation-in-part of my pending United States application, Serial No. 678,539, filed June 30, 1933.

This invention relates in general to endless track vehicles and more particularly has reference to the mounting of the load-carrying wheels or rollers on the vehicle.

An object of this invention is to provide flexible joints in endless track vehicles which require no maintenance, are silent, and allow a limited stroke or movement.

Another object of this invention is to provide a flexible joint for attaching an equalizing arm connecting a set of load-carrying wheels or rollers to the vehicle.

In order to more fully describe the present invention, reference is made to the accompanying drawings, in which:

Figure 1 is a somewhat diagrammatic side view of an endless track vehicle embodying the present invention.

Fig. 2 is a detailed sectional view taken on line 2—2 of Fig. 1.

Fig. 3 is an enlarged side view illustrating the joint between the equalizer lever and the vehicle.

Fig. 4 is a sectional view taken on line 4—4 of Fig. 3.

Fig. 5 is a sectional view taken vertically through the center of Fig. 3.

Fig. 6 is an end view of a modified form of joint.

Fig. 7 is a sectional view taken on line 7—7 of Fig. 6.

In Fig. 1 of the drawings, there is a fragmentary showing of the running gear of an endless track vehicle comprising front and rear wheels 10 and 10' which carry the endless track 12. The load of the vehicle is supported by the carrying wheels or rollers 11 which bear on the endless track. Rollers 11 are arranged in sets connected by equalizer levers 4 which are carried by the chassis of the vehicle, such as the ends of the main equalizer 3.

Casing elements 1 are attached by means of lugs 2 to the ends of the main equalizer 3 and serve for mounting the fulcrums of levers 4 on the ends of main equalizer 3.

In the form of invention shown in Figs. 1 to 5, each lever 4 is provided on each side of its center portion or fulcrum with cross-shaped vanes or ribs 5 rigid therewith.

The casing elements 1 are provided with rectangular openings of suitable dimensions in which are fitted pieces of plastic material 6, which material envelops the cross-shaped parts 5 of the equalizer 4. This plastic material may be more or less elastic and more or less compressed in its housing. The flexibility and the magnitude of the movement or stroke of the equalizer depend upon the compression and elasticity of the said material.

The manner in which such a device operates will be readily appreciated. The flexible material 6 maintains the equalizer 4 in position. The arms of the cross-shaped part 5 limit the movement of the equalizer 4 by compressing more or less the plastic material 6 according to the amplitude of the stroke or movement of the equalizer itself.

With this construction, the noise and need for lubricating the usual metal joints are eliminated, so that a quiet smooth-running vehicle is provided.

A modification of the present invention is shown in Figs. 6 and 7, in which the equalizer lever 4 is constituted by two side plates 7, each carrying on one side ribs 8 similar for each plate, the whole being connected together by a single bolt 9. The joint, instead of being effected on each side of the equalizer as in Figs. 1 to 5, is effected between the two side plates constituting the equalizer. The plastic material 6 is held fast in the element 1 for attaching the device to the main equalizer 3 or frame of the machine and acts upon the cross-shaped ribs 8 of the plates 7.

According as to whether the equalizer has to support a more or less considerable load, with for example a greater effort in a well-determined direction, the ribs may be directed to resist the said effort. In some cases, they may even be of unequal dimensions, either in order to cause one part to be stressed more than the other, or to afford more resistance in a certain direction. Furthermore, the elements of plastic material may be of irregular form. For example, the upper part may be thicker than the lower part, or vice-versa. One of these parts may likewise be made of more flexible material than the other, and so on.

It will be appreciated that it is possible to obtain varying effects, by varying the form of the projections of the equalizer, or the quality or the degree of compression of the plastic material on the distribution, such effects influencing either the amplitude of the stroke or movement, the smoothness of working, the resiliency of the system or its rigidity.

I claim:—

1. In an endless track vehicle having sets of carrying wheels, a main equalizer lever for distributing the load to the sets of carrying wheels, secondary equalizer levers each having two wheel-carrying arms for distributing the load to the wheels of each set of wheels, means for mounting the secondary levers on the ends of said main lever comprising rectangular cages each open only on its sides parallel to the plane of oscillation of the secondary levers carried by each end of the main lever, a cross-shaped spider-like member mounted in each cage and rigidly attached to a secondary lever, and flexible plastic material fixed in and filling said cage for resisting rotation of said cross-shaped spider-like member therein.

2. In an endless track vehicle having sets of carrying wheels, a main equalizer lever for distributing the load to the sets of carrying wheels, secondary equalizer levers each having two wheel-carrying arms for distributing the load to the wheels of each set of wheels, means for mounting the secondary levers on the ends of said main lever comprising rectangular cages each open only on its sides parallel to the plane of oscillation of the secondary levers carried by each end of the main lever, each secondary lever being constructed of two spaced elongated plate-like members mounted on opposite sides of each rectangular cage and closing the open side thereof, a cross-shaped spider-like member fixed to each two plate-like members and mounted in said cage, and flexible plastic material fixed in and filling said cages for resisting rotation of said cross-shaped spider-like members therein.

ADOLPHE KÉGRESSE.